US008018936B2

(12) United States Patent
Peterson

(10) Patent No.: US 8,018,936 B2
(45) Date of Patent: Sep. 13, 2011

(54) INTER-FABRIC ROUTING

(75) Inventor: David Peterson, Princeton, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 1081 days.

(21) Appl. No.: 11/140,355

(22) Filed: May 26, 2005

(65) Prior Publication Data

US 2006/0034302 A1 Feb. 16, 2006

Related U.S. Application Data

(60) Provisional application No. 60/589,099, filed on Jul. 19, 2004.

(51) Int. Cl.
H04L 12/56 (2006.01)
(52) U.S. Cl. .......... 370/392; 370/389; 370/395.51; 370/395.71; 370/395.72; 370/401; 370/402; 370/470; 370/471; 359/341.1; 359/341.2
(58) Field of Classification Search .......... 370/389, 370/392, 395.51, 395.71, 395.72, 401, 402, 370/470, 471; 359/341.1, 341.2
See application file for complete search history.

(56) References Cited

U.S. PATENT DOCUMENTS

| | | | |
|---|---|---|---|
| 6,269,404 B1 | 7/2001 | Hart et al. ............... 709/238 |
| 6,285,276 B1 | 9/2001 | Nedele et al. ............ 358/160 |
| 6,339,842 B1 * | 1/2002 | Fernandez et al. ........ 725/133 |
| 6,401,128 B1 | 6/2002 | Stai et al. ................ 709/236 |
| 7,206,288 B2 * | 4/2007 | Cometto et al. .......... 370/249 |
| 7,292,567 B2 | 11/2007 | Terrell et al. ............ 370/389 |
| 7,533,256 B2 * | 5/2009 | Walter et al. ............ 713/153 |
| 7,936,769 B2 * | 5/2011 | Chung et al. ............ 370/401 |
| 2002/0013848 A1 | 1/2002 | Rene Salle .............. 709/226 |
| 2002/0101859 A1 | 8/2002 | Maclean ................. 370/352 |
| 2002/0110125 A1 * | 8/2002 | Banks et al. ............. 370/392 |
| 2002/0114328 A1 | 8/2002 | Miyamoto et al. ........ 370/389 |
| 2002/0141424 A1 | 10/2002 | Gasbarro et al. ......... 370/412 |
| 2002/0163910 A1 * | 11/2002 | Wisner et al. ............ 370/389 |
| 2002/0165978 A1 | 11/2002 | Chui ..................... 709/238 |
| 2002/0191602 A1 | 12/2002 | Woodring et al. ........ 370/389 |
| 2003/0012204 A1 | 1/2003 | Czeiger et al. |
| 2003/0030866 A1 | 2/2003 | Yoo ..................... 359/128 |

(Continued)

OTHER PUBLICATIONS

Weber et al., Fibre Channel (FC) Frame Encapsulation, Dec. 2003, The Internet Society.*

(Continued)

*Primary Examiner* — Aung S Moe
*Assistant Examiner* — Hoon J Chung
(74) *Attorney, Agent, or Firm* — Wong, Cabello, Lutsch, Rutherford & Brucculeri LLP

(57) ABSTRACT

A method and apparatus is shown for communicating Fibre Channel frames between distinct fabrics. A proxy zone is established in each fabric with a physically present local device and a remote fabric device. A router creates a proxy device in each fabric for every device not physically connected to the fabric. The proxy devices appear to be directly attached to the router. The router handles all address translations between proxy and physical addresses. When multiple routers are encountered, the ingress router does all address translation. No routing or encapsulation headers are used except when routing between two routers. The source ID and the originator exchange identifier are stored at the egress router for all link requests that require special handling. When replies pass through that router, the destination ID and originator exchange identifier are compared with the stored information. On a match, the reply is specially handled.

18 Claims, 18 Drawing Sheets

U.S. PATENT DOCUMENTS

| | | | |
|---|---|---|---|
| 2003/0118053 A1 | 6/2003 | Edsal et al. | |
| 2003/0158971 A1 | 8/2003 | Renganarayanan et al. | 709/248 |
| 2003/0189930 A1* | 10/2003 | Terrell et al. | 370/389 |
| 2003/0189936 A1* | 10/2003 | Terrell et al. | 370/395.31 |
| 2004/0024911 A1 | 2/2004 | Chung et al. | 709/249 |
| 2004/0151174 A1 | 8/2004 | Del Signore et al. | |
| 2005/0025075 A1 | 2/2005 | Dutt et al. | |
| 2005/0036499 A1 | 2/2005 | Dutt et al. | |
| 2005/0073956 A1 | 4/2005 | Moores et al. | 370/235 |
| 2005/0198523 A1 | 9/2005 | Shanbhag et al. | 713/200 |
| 2005/0232285 A1* | 10/2005 | Terrell et al. | 370/401 |
| 2006/0023708 A1 | 2/2006 | Snively et al. | 370/389 |
| 2006/0023725 A1 | 2/2006 | Makishima et al. | 370/398 |
| 2006/0023726 A1 | 2/2006 | Chung et al. | 370/398 |
| 2006/0023751 A1 | 2/2006 | Wilson et al. | 370/474 |
| 2006/0034302 A1 | 2/2006 | Peterson | 370/401 |

OTHER PUBLICATIONS

Newman et al., Seagate Fibre Channel Interface Product Manual, Mar. 21, 1997, Seagate.*
Elsbernd et al., Fabric Expansion Study Group Draft minutes 03-691v0, Oct. 7, 2003.*
Fabric Extension Study Group, Draft Minutes, T11/04-129v0, Feb. 3, 2004.
Pelissier et al., FR_Header Definition, T11/04-241v0, Apr. 2004.
Frame Routing Extended Header (FR_Header), T11/05-214v0 Revision 3, Mar. 15, 2005.
Inter-Fabric Routing Extended Header (IFR_Header), T11/05-214v1 Revision 5d, May 20, 2005.
Pelissier et al., Inter-Fabric Routing (T11/04-520v0), Jul. 30, 2004.
Desanti et al., Inter-Fabric Routing, T11/04-408v0, Jun. 2004.
Transport Fabric Model Rev 1.3, T11/05-075v1, Apr. 1, 2005.
Pelissier et al., Inter-Fabric Routing Solutions, 05-232v1, Apr. 5, 2005.
Fabric Routing Types, T11/05-099v0, Feb. 1, 2005.
Weber et al.; "Fibre Channel (FC) Frame Encapsulation;" Dec. 2003; The Internet Society.
"Fibre Channel Backbone (FC-BB);" Rev 4.7; NCITS working draft proposed American National Standard for Information Systems; Jun. 8, 2000.
"Fibre Channel Backbone (FC-BB-2);" Rev 6.0; INCITS working draft proposed American National Standard for Information Systems; Feb. 4, 2003.
"Fibre Channel Switch Fabric—2 (FC-SW-2);" Rev 5.3; NCITS working draft proposed American National Standard for Information Technology; Jun. 26, 2001.
Travostino et al.; "IFCP—A Protocol for Internet Fibre Channel Networking;" Dec. 2002.
Rajagopal et al.; IP and ARP over Fibre Channel; Network Working Group Request for Comments 2625; Gadzooks Networks; Jun. 1999.
"Fibre Channel Physical and Signaling Interface (FC-PH) Rev 4.3;" Working Draft Proposed American National Standard for Information Systems; Jun. 1, 1994; pp. begin-32, 96-110 & 141-157.
IP Storage Working Group, IETF, "draft-monia-ips-ifcparch-00.txt", Internet Draft Standard, Nov. 2000, pp. 1-18.
IP Storage Working Group, IETF, "draft-monia-ips-ifcp-01.txt", Internet Draft Standard, Jan. 2001, pp. 1-48.
IP Storage Working Group, IETF, "draft-chau-fcip-ifcp-encap-00.txt", Internet Draft Standard, Feb. 2001, pp. 1-8.
IP Storage Working Group, IETF, "draft-monia-ips-ifcpenc-00.txt", Internet Draft Standard, Feb. 2001, pp. 1-7.
IP Storage Working Group, IETF, "draft-tseng-ifcpmib-00.txt", Internet Draft Standard, Aug. 2001, pp. 1-22.
IP Storage Working Group, IETF, "draft-moina-ips-ifcplcc-00.txt", Internet Draft Standard, Apr. 2002, pp. 1-44.
IP Storage Working Group, IETF, "draft-ietf-ips-ifcp-wglcc-01.txt", Internet Draft Standard, May 2002, pp. 1-45.
IP Storage Working Group, IETF, "draft-ietf-ips-ifcp-01.txt", Internet Draft Standard, Feb. 2001, pp. 1-55.
IP Storage Working Group, IETF, "draft-ietf-ips-ifcp-02.txt", Internet Draft Standard, May 2001, pp. 1-68.
IP Storage Working Group, IETF, "draft-ietf-ips-ifcp-03.txt", Internet Draft Standard, Jul. 2001, pp. 1-67.
IP Storage Working Group, IETF, "draft-ietf-ips-ifcp-04.txt", Internet Draft Standard, Aug. 2001, pp. 1-84.
IP Storage Working Group, IETF, "draft-ietf-ips-ifcp-05.txt", Internet Draft Standard, Sep. 2001, pp. 1-91.
IP Storage Working Group, IETF, "draft-ietf-ips-ifcp-06.txt", Internet Draft Standard, Oct. 2001, pp. 1-91.
IP Storage Working Group, IETF, "draft-ietf-ips-ifcp-07.txt", Internet Draft Standard, Nov. 2001, pp. 1-90.
IP Storage Working Group, IETF, "draft-ietf-ips-ifcp-08.txt", Internet Draft Standard, Jan. 2002, pp. 1-98.
IP Storage Working Group, IETF, "draft-ietf-ips-ifcp-09.txt", Internet Draft Standard, Jan. 2002, pp. 1-97.
IP Storage Working Group, IETF, "draft-ietf-ips-ifcp-10.txt", Internet Draft Standard, Feb. 2002, pp. 1-98.
IP Storage Working Group, IETF, "draft-ietf-ips-ifcp-11.txt", Internet Draft Standard, May 2002, pp. 1-103.
IP Storage Working Group, IETF, "draft-ietf-ips-ifcp-12.txt", Internet Draft Standard, Jun. 2002, pp. 1-104.
IP Storage Working Group, IETF, "draft-ietf-ips-ifcp-13.txt", Internet Draft Standard, Aug. 2002, pp. 1-104.
IP Storage Working Group, IETF, "draft-ietf-ips-ifcp-14.txt", Internet Draft Standard, Dec. 2002, pp. 1-104.
Fibre Channel Framing and Signaling-2, standard, Apr. 1, 2004, p. Nos. i-11, Rev. 0.10, INCITS working draft proposed American National Standard for Information Technology.

* cited by examiner

| Receiving Router/Port | Received D_ID/S_ID Pair | Address Translation D_ID/S_ID Pair | Transmit Port |
|---|---|---|---|
| UR-1/E-1 | A00100/B00004 | D00010/C00400 | VEP-4 |
| UR-2/VEP-1 | D00010/C00400 | -- (routing only) | E-4 |
| UR-2/E-4 | C00400/D00010 | B00004/A00100 | VEP-1 |
| UR-1/VEP-4 | B00004/A00010 | -- (routing only) | E-1 |

Figure 13

IFR_Header Format

| Bits Word | 31...24 | 23...08 | 07...00 |
|---|---|---|---|
| 0 | R_CTL = 51h  602 | Rsvd(4) | DF_ID (12) 604 | Exp_Time 616 |
| 1 | Ver (2) 606 | Pri (3) 608 | Rsvd | ETV 610 | HCV 612 | Rsvd(4) | SF_ID (12) 614 | Rsvd(4) | Hop_Cnt (4) 618 |

Figure 14

EXP_TIMESTAMP Field

| Bit Word | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | | | | | | | | | | | | | | | | | | | | | | | | | | | EXP_TIMEST | | | | | |
| 1 | AMP | | | | | | | | | | | | | | | | | | | | | | | | | | | | | | | |

Figure 15

Encapsulation Header Format

| Bits Word | 31..........24 | 23..........16 | 15..........8 | 7..........0 |
|---|---|---|---|---|
| 0 | R_CTL=52h | D_ID | | |
| 1 | CS_CTL/Priority | S_ID | | |
| 2 | TYPE | F_CTL | | |
| 3 | SEQ_ID | DF_CTL | SEQ_CNT | |
| 4 | OX_ID | | RX_ID | |
| 5 | Parameter | | | |

ERP SW_ILS Request Payload

| Item | Size Bytes |
|---|---|
| Command Code = 37h | 1 |
| Reserved | 3 |
| Switch_Name | 8 |

ERP Accept Payload

| Item | Size Bytes |
|---|---|
| 02000000h | 4 |

EMRT Request Payload

| Item | Size Bytes |
|---|---|
| Command Code = 38h | 1 |
| Reserved | 1 |
| Number of Mapping_Table_List records | 2 |
| Mapping_Table_List records | N |

Mapping_Table_List Record Format

| Item | Size Bytes |
|---|---|
| N_Port_Name | 8 |
| Reserved | 1 |
| N_Port_ID | 3 |
| Reserved | 1 |
| Proxy N_Port_ID | 3 |

ERMT Accept payload

| Item | Size Bytes |
|---|---|
| 02000000h | 4 |

Extended Link Service R_CTL values

| | Extended Link Service | | FC-4 Link services | |
|---|---|---|---|---|
| | Request | Reply | Request | Reply |
| R_CTL | 22h | 23h | 32h | 33h |

Figure 22

Extended Link Service Processing

| ELS | Command Code | Support |
|---|---|---|
| Abort Exchange (ABTX) | 06h | Optional |
| Discover Address (ADISC) | 52h | Required |
| Discover Address LS_Accept (ADISC LS_ACC) | | Required |
| FC Address Resolution Protocol Request (FARP-REQ) | 54h | Required |
| FC Address Resolution Protocol Reply (FARP-REPLY) | 55h | Required |
| Logout (LOGO) | 05h | Required |
| Port Login (PLOGI) | 03h | Required |
| Port Login LS_Accept (PLOGI LS_ACC) | | Required |
| Read Exchange Concise (REC) | 13h | Required |
| Read Exchange Concise (REC LS_ACC) | | Required |
| Read Exchange Status Block (RES) | 08h | Optional |
| Read Exchange Status Block (RES LS_ACC) | | Optional |
| Read Link Error Status Block (RLS) | 0Fh | Required |
| Read Seqeunce Status Block (RSS) | 09h | Optional |
| Reinstate Recovery Qualifier (RRQ) | 12h | Required |
| Request Sequence Initiative (RSI) | 0Ah | Optional |
| Scan Remote Loop (SRL) | 7Bh | Optional |
| Third Party Process Logout (TPRLO) | 24h | Required |
| Third Party Process Logout LS_Accept (LS_ACC) | | Required |

FC-4 Link Service Processing

| ELS | Command Code | Support |
|---|---|---|
| Read Exchange Concise (REC) | 13h | Required |
| Read Exchange Concise LS_Accept (REC LS_ACC) | | Required |

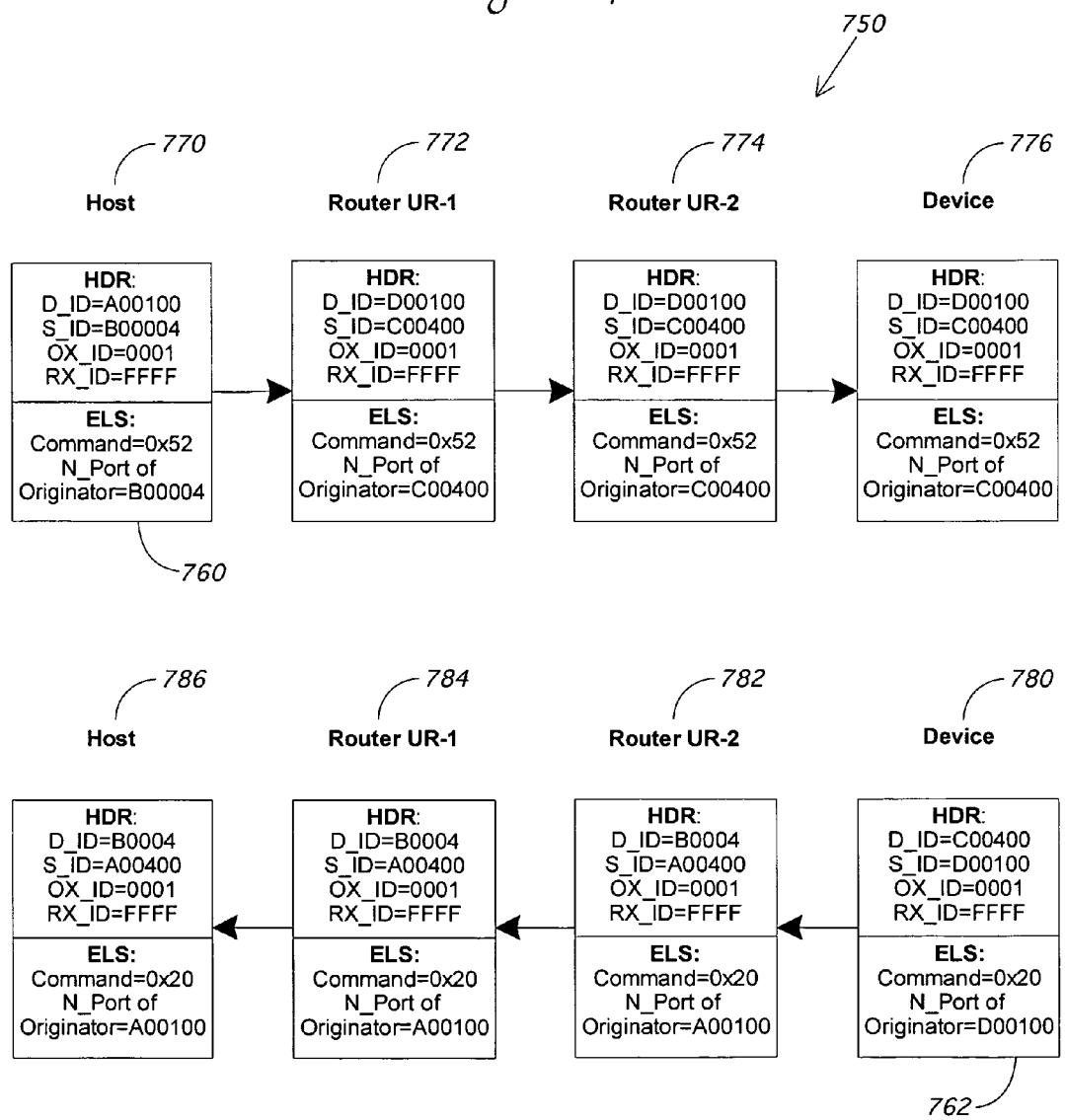

Link Service Processing Details

| Link Service | Description |
| --- | --- |
| ADISC | The Hard Address of Originator field shall be set to all zeroes. The N_Port_ID of Originator field shall be translated. |
| ADISC LS_ACC | The Hard Address of Responder field shall be set to all zeroes. The N_Port_ID of Responder field shall be translated. |
| FARP-REQ | The Requesting N_Port_ID field shall be translated. |
| FARP-REPLY | The Requesting N_Port_ID and Responding N_Port_ID fields shall be translated. |
| LOGO | The N_Port_ID field shall be translated. |
| REC | The Exchange Originator S_ID field shall be translated. |
| REC LS_ACC | The Originator Address Identifier and Responder Address Identifier fields shall be translated. |
| RLS | The N_Port_ID field shall be translated. |
| RRQ | The Originator S_ID field shall be translated. |
| TPRLO | The Third Party Originator N_Port_ID field shall be translated. |
| TPRLO LS_ACC | The Third Party Originator N_Port_ID field shall be translated. |

INTER-FABRIC ROUTING

PRIORITY

This application claims the benefit of U.S. Provisional Patent Application No. 60/589,099, filed Jul. 19, 2004.

FIELD OF THE INVENTION

The invention presented in this application pertains generally to the routing of information between remote devices. More particularly, the present invention relates to the routing of Fibre Channel frames between separate Fibre Channel fabrics.

BACKGROUND OF THE INVENTION

Fibre Channel is a switched communications protocol that allows concurrent communication among servers, workstations, storage devices, peripherals, and other computing devices. Fibre Channel can be considered a channel-network hybrid, containing enough network features to provide the needed connectivity, distance, and protocol multiplexing, and enough channel features to retain simplicity, repeatable performance, and reliable delivery. Fibre Channel is capable of full-duplex transmission of frames at rates extending from 1 Gbps (gigabits per second) to 10 Gbps. It is also able to transport commands and data according to existing protocols such as Internet protocol (IP), Small Computer System Interface (SCSI), High Performance Parallel Interface (HIPPI) and Intelligent Peripheral Interface (IPI) over both optical fiber and copper cable.

FIG. 1 illustrates a variable-length Fibre Channel frame 10. The frame 10 has a 4-byte start-of-frame (SOF) indicator 12, which is a particular binary sequence indicative of the beginning of the frame 10. The SOF indicator 12 is followed by a 24-byte header 14, which specifies, among other things, the frame source address and the frame destination address. A variable-length data field 16 follows the header 14, which can range from 0 to 2112 bytes in length. The data field 16 is followed by a 4-byte cyclical redundancy check (CRC) code 18 for error detection, and by a 4 byte end-of-frame (EOF) indicator 20. Since the data payload 16 of a Fibre Channel frame can vary between 0 and 2112 bytes, the total length of a Fibre Channel frame 10 can vary from 36 to 2148 bytes.

The frame header 14 is twenty-four bytes long, containing six four-byte words as shown in FIG. 2. The frame header 14 contains a destination address or identifier (D_ID) 60 and a source address or identifier (S_ID) 70. These address fields 60, 70 both contain a twenty-four bit address that uniquely identifies a device on a Fibre Channel fabric, and are described in more detail below. In addition to these address fields 60, 70, the frame header 14 contains a routing control field (R_CTL) 40, a class specific control field (CS_CTL) 42, frame type (TYPE) 44, frame control field (F_CTL) 46, sequence identifier (SEQ_ID) 48, data field control (DF_CTL) 50, sequence count (SEQ_CNT) 52, originator exchange identifier (OX_ID) 54, responder exchange identifier (RX_ID) 56, and parameter value (PARAM) 58. The R_CTL field 40 contains routing bits and categorizes the frame. The CS_CTL 42 contains class specific control data or priority data. The TYPE field 44 identifies the protocol of the Fibre Channel frame 10. The F_CTL field 46 contains control information relating to the frame content, such as first sequence, last sequence, or end sequence bits. The SEQ_ID field 48 identifies frames within a sequence to assure frame order, and to correlate link control frames with related data frames. The DF_CTL field 50 specifies the presence of optional headers at the beginning of the data payload 16. The SEQ_CNT field 52 indicates the sequential order of the data frame 10 within a single sequence or multiple consecutive sequences for the same exchange. The OX_ID field 54 identifies the data communication exchange for the originating computer. The RX_ID field 56 identifies the data communication exchange for the originally receiving computer. The parameter/data field 58 can identify link control frames and carry related data. Alternatively, for data frames, the parameter/data field 64 can contain a data offset value. The third bit of the F_CTL field 46 indicates whether the parameter/data field 64 is being used to indicate a relative offset or not.

As explained above, the destination identifier (D_ID) 60 identifies the desired destination for the frame, while the source identifier (S_ID) 70 identifies the source for the frame. These identifiers 60, 70 are considered port identifiers or Fibre Channel addresses 80, as shown in FIG. 3. Port identifiers 80 are uniquely assigned to every node in a Fibre Channel fabric. Under the standard Fibre Channel switch fabric addressing scheme, each port identifier 80 is considered to contain three eight-bit words: a domain address or domain ID 82, an area address or area ID 84, and a port address or port ID 86. Each switch in a Fibre Channel fabric is generally assigned a unique domain address 82. When switch ports are directly connected to only a single device, the area ID 84 will representing a logical or physical grouping of ports, with the particular port being identified in by port ID 86. More frequently, however, multiple devices are allowed to connect to a single physical port on a switch using an arbitrated loop. In these circumstances, the area ID 84 represents a particular port on the switch, and the port ID 86 identifies the particular device on the loop. The addressing scheme allows 256 port IDs 86 and 256 area IDs 84, but only 239 domain IDs 82. This smaller number of domain IDs results from the fact that some domain/switch addresses are reserved.

Fibre Channel switches use the destination identifier 60 found in header 14 to route frames 10 from a source port to a destination port. The Fibre Channel addressing scheme in FIG. 3 allows certain routing decisions to be made by examining only the eight bits in the domain ID 82. Typically, this is accomplished using a lookup table at each input port. The destination identifier 60 is used as an index to the table, and the table returns the appropriate output port in the switch. This output port will either be directly connected to the node identified by the destination identifier 60, or to another switch along the path to the identified destination. Routing tables are shared between multiple switches in a fabric over an inter-switch link so that the switches can learn about the nodes and switches that make up the fabric.

Switches uses port identifiers 80 to establish zoning for a fabric, which allows devices to be logically segregated based on function, business departments, or operating system conflicts. FIG. 4 shows an example of zoning, where servers A and B exist on the same fabric 90 as disk devices X and Y, and tape storage Z. Disk devices X and Y are assigned to zones 1 and 2, respectively, while tape storage Z is assigned to zone 3. Server A is part of zones 1 and 3, and therefore is allowed by the fabric 90 to communicate with disk device X and tape storage Z. Server B is part of zones 2 and 3, meaning that this server is allowed to communicate only with disk device Y and tape storage Z. In this manner, zoning prevents server A from seeing or accessing disk device Y, and server B from seeing or accessing disk device X. Both servers are allowed access to tape storage Z. Zoning can be done on a port basis, thereby allowing a particular physical port on a switch to communicate with a different physical port elsewhere on the fabric.

Unfortunately, this type of zoning is meaningless if the devices are ever physically moved from one port on a switch to another.

Alternatively, zoning can occur at the World Wide Name level. A World Wide Name (or WWN) is a 64-bit name that is uniquely assigned to every Fibre Channel device and port created. By using the WWN to define and implement the zones, a particular computer or storage device will be recognized by its WWN and properly zoned regardless of the physical port on which the device is found.

The Word Wide Name of a device is made known to the fabric during device login, during which a port identifier 80 is also automatically assigned to the device. The Domain ID 82 of the assigned port identifier 80 will be the same as the Domain ID 82 of the switch to which the device is connected. This port identifier 80 is associated with the WWN in a name server operating on the fabric 90. Devices log into this name server during a fabric and port login procedure, which is required before the device can access (or be accessed by) the fabric. The name server records the WWN of the device, and the device's associated port identifier 80. The name server functionality is implemented in each switch on a fabric 90.

Fibre Channel is typically implemented in a fabric made up of one or more Fibre Channel switches. The purpose of the fabric is to interconnect the various devices or node ports (N_ports). This is accomplished by attaching the N_ports to fabric ports (F_ports) associated with a switch in the fabric. Multiple switches communicate with each to form a multi-switch fabric. Switch to switch communication links takes place over expansion ports (E_ports), and are generally referred to as inter-switch links.

The interswitch links formed over the E_ports are used to coordinate knowledge about the physical layout of the fabric, which is used when routing Fibre Channel frames 10 over a fabric 90. Switches use a link state database and a routing protocol known as Fabric Shortest Path First (FSPF) to make routing decisions over a fabric 90. To communicate this information, Fibre Channel switches are able to communicate a variety of message types, including extended link service messages (FC-ELS), generic service messages (FC-GS), and switch internal link service messages (SW-ILS).

Some of the more important extended link services (ELS) are N_Port Device Discovery: FLOGI—Fabric Login, PLOGI—N_Port Login, and RSCN—Registered State Change Notification. FLOGI enables a device or N_Port to obtain its port identifier 80 and to create a communication channel with a switch by setting or exchanging various operational parameters. PLOGI enables a device to create a communication channel with the remote device over the fabric by setting and exchanging operational parameters. An RSCN is issued by Fabric Controller in a switch to notify all the registered devices when an event occurs, such as a failed connection with a device or a new device.

The generic services include services performed by the name server in the switch. For instance, an RFF_ID is a communication sent by a device to a switch after the device completes FLOGI. This allows the device to be registered with the name server database. The switch then uses an RSCN ELS to notify other registered devices of this new device.

The switch internal link services (SW-ILS or ILS) are used to configure the Switch Fabric, and to build and maintain required routing tables. Some of the most important ILS commands include ELP (Exchange Link Parameters), HLO (an FSPF Hello), LSU (an FSPF Link State Update), LSA (an FSPF Link State Acknowledgement), and SW_RSCN (an Inter-Switch RSCN). The ELP helps to establish a communication channel between adjacent E_Port by setting or exchanging operational parameters. All of these ILS commands are issued between adjacent E_Ports and use Fabric Controller Fibre Channel address 80 (0xFFFFFD) as the S_ID and D_ID for both request and reply sequences. The HLO command establishes a communication channel between two switches between their E_ports. LSU and LSA commands contain Link State Records (LSR) and Link Descriptors (LD), which are used to establish and maintain a synchronized topology database for the fabric and a related routing table. Finally, a SW_RSCN is used to distribute ELS RSCNs between switches.

In order for Fibre Channel routing to function properly, it is vital that every device on a fabric 90 have a unique port identifier 80 and that every switch in the fabric 90 have a different domain ID 82 assigned to it. This effectively limits the size of a network to at most 237 switches. Although this is a large number of switches for most circumstances, this limit requires the physical separation of one fabric from another. It would not be possible to create a world-wide storage area network similar to the Internet given a limitation of 237 switches.

This reality has recently led several vendors to explore the possibility of sharing data between separate fabrics. Unfortunately, the requirement for unique port identifiers 80 has made it impossible to transmit frames between fabrics without considerable concern over the port identifiers involved in the communication. Since each fabric separately assigns port identifiers 80, it is likely that there will be some overlap in assigned domain IDs 82 and port identifiers 80 between the fabrics.

One approach to this problem is set forth in U.S. Published Patent Application No. 2005/0025075. In this application, the separate fabrics are described as Virtual SANs. While virtual SANs are storage area networks that are virtually defined as separate even though they exist on the same physical switch, the technique of this application could be used to communicate across separate physical fabrics. The problem of conflicting domain IDs is avoided by implementing techniques to ensure this doesn't happen. For instance, the application suggests administratively partitioning the domain number space across the VSANs to be connected so that each fabric can assign only a unique subset of domain names. Alternatively, the application suggests reserving a subset of domain IDs to be used only for switches involved in inter-VSAN communications. In this way, both fabrics could be allowed to use most of the available domain IDs 82 (such as the first 200) in a standard manner without concern over duplicate usage. The remaining 37 domain IDs would be assigned from a central location, thereby ensuring only one switch in the combined fabric would be assigned a particular domain ID 82. All communication between fabrics would then be limited to those devices whose domain IDs 82 are centrally managed.

A second approach is outlined in U.S. Published Patent Application No. 2003/0012204. In this application, multiple fabrics are linked together using gateways so as to allow the combined storage area networks to exceed the Fibre Channel limit of 237 switches in a single fabric. This application overcomes the problem of conflicting Domain IDs by assigning each switch a "global address" as well as the local address typically assigned in Fibre Channel fabrics. The global address is created by combining multiple physical switches into a virtual switch, and then assigning a single global domain ID to the virtual switch group. When communications are made using this global address, the entire set of switches is considered a single virtual switch. The ports on the various switches are then addressed directly as ports on the virtual switch. Internal communications within the SAN use only local addressing, and are unaffected by the presence of the gateways and the related global addresses. When a communication is directed to a device on a separate remote fabric, the communication will use the global address for that device, using the virtual switch ID associated with that device. The routing for this communication passes through the local or ingress gateway. The ingress gateway translates the source address in the communication from the local address created by the local device to the pre-assigned virtual address (with the virtual address typically combining multiple physical switches into a single virtual switch). The ingress gateway then transmits this communication on to a remote or egress gateway physically connected to the remote fabric. The egress gateway looks to see if the D_ID is a virtual address (to one of its virtual switches). If so, the egress gateway translates the D_ID to a local address. Virtual addresses for a device only make sense outside of the physical SAN on which the device is located. Although each fabric is still limited to 237 switch addresses, the combining of switches on remote fabric into virtual switches means that many more than 237 switches can be accessed on the combined inter-fabric.

Unfortunately, neither of the above approaches provides a flexible enough technique so as to allow inter-fabric data communication between Fibre Channel fabrics.

SUMMARY OF THE INVENTION

The present invention presents a unique system and technique for allowing the communication of Fibre Channel frames between distinct Fibre Channel fabrics. Domain ID conflicts are handled through the use of proxy zoning and proxy devices. A proxy zone must be established in each fabric that will be linked together. Each proxy zone must include at least one device that is physically present in the local fabric and one device that is physically connected to a different, remote fabric. A router of the present invention then establishes a separate proxy device in each fabric for every device in the proxy zones that is not physically connected to the fabric. The proxy devices all use the domain ID of the router, thereby allowing all remote devices to appear to the fabric as if they were directly attached to the router. Thus, in each fabric being connected, proxy devices exist for all the devices that are available for communication and are not found on the fabric.

A local device communicates with the proxy device as if it were physically present on the fabric. The router intercepts the communication, and performs address translation on the source ID and the destination ID in the Fibre Channel frame header. The destination ID is translated from the proxy address of the remote device to the actual physical address of the remote device on the remote fabric. The source ID is translated from the physical address of the local device to the proxy address used for that local device on the remote fabric. A new CRC value is also calculated. The altered frame is then transmitted to the remote fabric, where it is routed to the actual physical device represented by the proxy device.

The present invention is able to route communications between a plurality of routers. To do so, one router must be the ingress router while another router is the egress router. All address translations occur at the ingress router.

To allow more complicated routing, the present invention proposes an inter-fabric routing header. This routing header is not needed when a single router connects multiple fabrics, or where a link between two routers does not require routing. However, the routing header does provide mechanisms to detect stale frames, prioritize frames, and to detect routing loops. To ensure that frames having a router header can pass through legacy fabrics, the present invention proposes the use of an encapsulation header.

Certain link service messages require special handling in the context of inter-fabric Fibre Channel communications. These original link service frames can be detected by examining the R_CTRL value and the command value for a link service frame. However, many replies to link service messages use the same command value. Hence, it is not practical to determine which replies require special handling simply by examining R_CTRL and command values. The present invention solves this problem by storing at the egress router a source ID and an originator exchange identifier for each link service request sent to a device that required special handling. When replies pass through the same router, the destination ID and the originator exchange identifier are compared with the stored information. If a match is found, the ingress (formerly egress) router can identify the context of the reply and perform the required special handling.

BRIEF DESCRIPTION OF THE DRAWINGS

FIG. 13 is a table showing the format of an inter-fabric routing header of the present invention.

FIG. 14 is a table showing the format of a timestamp.

FIG. 15 is a table showing the format of an encapsulation routing header of the present invention.

FIG. 16 is a table showing the format of ERP ILS request payload.

FIG. 17 is a table showing the format of ERP ILS accept payload.

FIG. 18 is a table showing the format of EMRT ILS request payload.

FIG. 19 is a table showing the format of a Mapping_Table_List record.

FIG. 20 is a table showing the format of EMRT ILS accept payload.

FIG. 21 is a table showing the R_CTL value of link services that may require special handling.

FIG. 22 is a table listing the ELS commands that require special handling.

FIG. 23 is a table listing the Fibre Channel-4 Link Service Processing commands that require special handling.

FIG. 24 is a data flow process chart showing the handling of ELS replies requiring special handling.

FIG. 25 is a table showing the special handling done on certain link services.

DETAILED DESCRIPTION OF THE INVENTION

Local Inter-Fabric Routing

Figure 5:
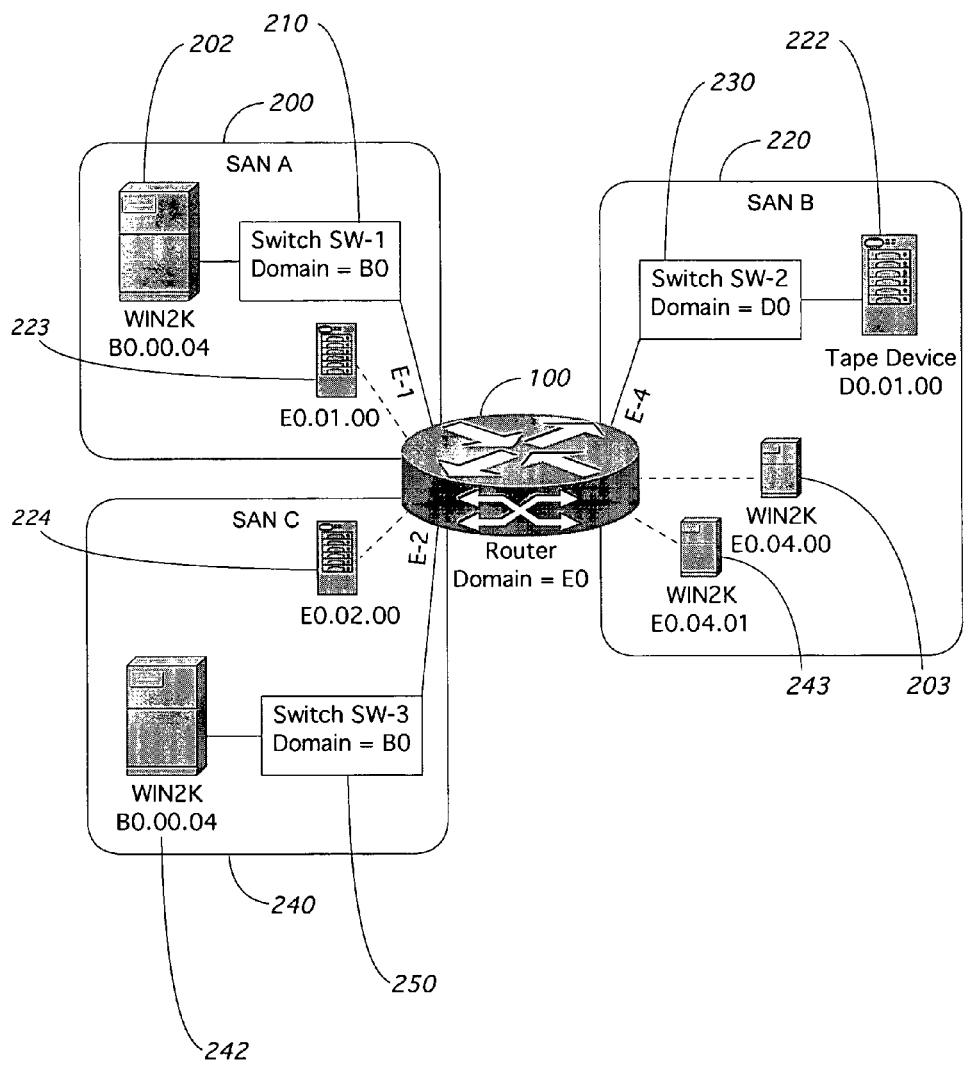
FIG. 5 is a block diagram showing a router of the present invention facilitating inter-fabric communications.

The present invention allows devices in different Fibre Channel fabrics to communicate with one another. An example of such communication is shown in FIG. 5, where a router 100 of the present invention is being used to link together three separate Fibre Channel fabrics or SANs, namely SAN A 200, SAN B 220, and SAN C 240. Inside of SAN A 200 is a switch 210 labeled Switch SW-1. This switch 210 is connected to the router 100 with what the switch 210 views as a standard interswitch link through an E-Port. This connection allows SAN A 200 to treat the router 100 as simply another switch within SAN A 200. Connected to switch SW-1 210 is a Windows server 202. Switch 210 has been assigned domain B0, with the Windows server 202 being assigned a port identifier of 'B0 00 04.' Similarly, inside SAN B 220 is switch SW-2 230, which has been assigned domain D0. Attached to switch 230 is a tape device 222, which has a Fibre Channel address of 'D0 00 00.' Finally, in SAN C 240 is switch SW-3 250, which has been assigned a domain of B0. This switch 250 is assigned the same domain ID 82 as switch 210, which is allowed because the two switches exist on two separate fabrics 200, 240. Attached to switch SW-3 250 is Windows server 242, which has been assigned Fibre Channel address 'B0 00 00'—the same address as Windows server 202.

The router 100 attaches to switches 210, 230, and 250 as another switch, and each fabric sees the router 100 as a switch existing entirely within its own fabric. In FIG. 5, router 100 has been assigned a domain ID 82 of 'E0' in each of the fabrics 200, 220, 240. Since the router 100 presents itself to each fabric 200, 220, 240 as a completely independent switch, it would be possible and even expected that the router 100 would have a different domain ID 82 within different each fabric 200, 220, 240. The ability of a single physical switch to present itself as separate switches is well known in the prior art as virtual switch technology. In the present concept, each virtual switch is presented to separate fabrics instead of presenting all virtual switches to a single Fibre Channel fabric. Alternatively, the router 100 could contain separate physical switches inside a single cabinet, with actual interswitch links linking the switch connected on one fabric to the switch of a different fabric.

In FIG. 5, router 100 allows Windows Server 202 in SAN A 200 to communicate with tape device 222 in SAN B 220, and vice versa. The router 100 simultaneously allows Windows server 242 in SAN B 240 to exchange communications with tape device 222. The router 100 accomplishes this by creating proxy devices within each of the fabrics 200, 220, 240. These proxy devices are virtual devices that present a device found in a remote fabric to the local fabric. In FIG. 5, router 100 has created a proxy device 223 in SAN A and a separate proxy device 224 in SAN C, both of which represent the actual tape device 222. These proxy devices 223, 224 are both represented inside fabrics 200 and 240 as being directly attached to the router 100. Therefore the Fibre Channel addresses 80 of these devices share the domain ID 82 used by router 100 in those fabrics, which in both cases is 'E0.' Similarly, the router 100 presents Windows servers 202 and 242 as proxy devices 203 and 243, respectively, that are attached directly to router 100 inside of SAN B 220. As such, both proxy devices have Fibre Channel addresses 80 containing the same domain name 82 as the router 100.

The proxy devices are created as entries in the name server databases found in fabrics 200, 220, 240. In the preferred embodiment of the present invention, these proxy devices 203, 223, 224, and 243 will use the same WWN as the physical devices 202, 222, 242 that they represent.

When the Windows server 202 in SAN A 200 wants to communicate with the tape device 222 in SAN B 220, it sends standard Fibre Channel frames to Fibre Channel address E0 01 00, which is the address of proxy 223. These frames are routed to router 100 by switch 210 based on the domain ID 82 of the destination address 60 found in the frame headers 14 of the frames 10. The router 100 receives these frames on behalf of the proxy device 223, and then submits the frames to SAN B 220 out the connected to switch SW-2 230. Before submitting the frames, however, the router 100 must translate the destination address 60 and the source address 70 found in the frames so as to make the frames consistent with the addresses found in SAN B 230. Specifically, the destination address 60 must be translated from the tape device's proxy address (E0 01 00) in SAN A 200 to the device's physical address in SAN B 220 (D0 01 00). In addition, the server's source address 70 must be translated from its physical address in SAN A 200 (B0 00 04) to the server's proxy address in SAN B 220 (E0 04 00). More generically, on any ingress to the router 100 that is addressed to a proxy address maintained by the router 100, the router 100 must:

1) translate the destination address 60 from the proxy address used on the source fabric to the actual physical address of the device on the destination fabric, and
2) translate the source address 70 from the physical address of the source device on the source fabric to the proxy address used for that device on the destination fabric.

When the tape device 222 receives these frames, it will respond to the source address found in the frames, which in this case is the E0 04 00 address of proxy device 203. The router 100 receives these response frames from the tape device 222, translates the destination address to the actual physical address of the server 202 on SAN A 200 (B0 00 04), and translates the source address to the proxy address used for the tape device on SAN A 200 (E0 01 00). The response frames are then placed on SAN A 200, and are routed by switch 210 to server 202 using standard Fibre Channel routing techniques. The above example would not change if the fabrics shown 200, 220, 240 in FIG. 5 contained multiple switches and the physical devices 202, 222, and 242 were multiple hops away from the router 100. Such hops and the associated routing are standard Fibre Channel communications, and are not relevant to the present invention.

Figure 6:
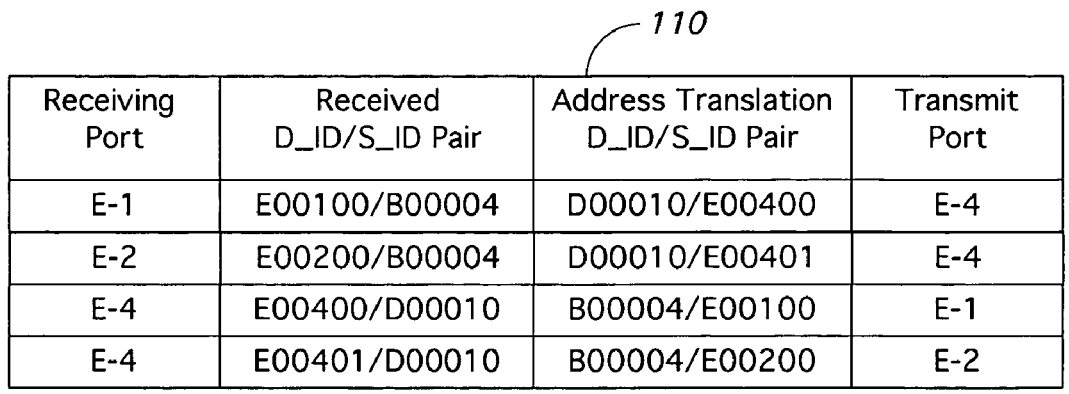
FIG. 6 is an address translation table with a routing port.

The router 100 uses a translation table to determine the appropriate translations, such as translation table 110 shown in FIG. 6. This translation table takes as input the receiving port, and the received D_ID 60 and S_ID 70 pair. In FIGS. 5 and 6, the port on router 100 that is connected to switch SW-1 210 is EP-1, the port connected to switch SW-2 230 is port EP-4, and the port connected to switch SW-3 is port EP-2. The router 100 must also perform the proper routing determination so as to ensure that the incoming frame is directed out of the correct port. This routing determination has been simplified in FIG. 6 by including the transmit port in the translation table.

Figure 7:
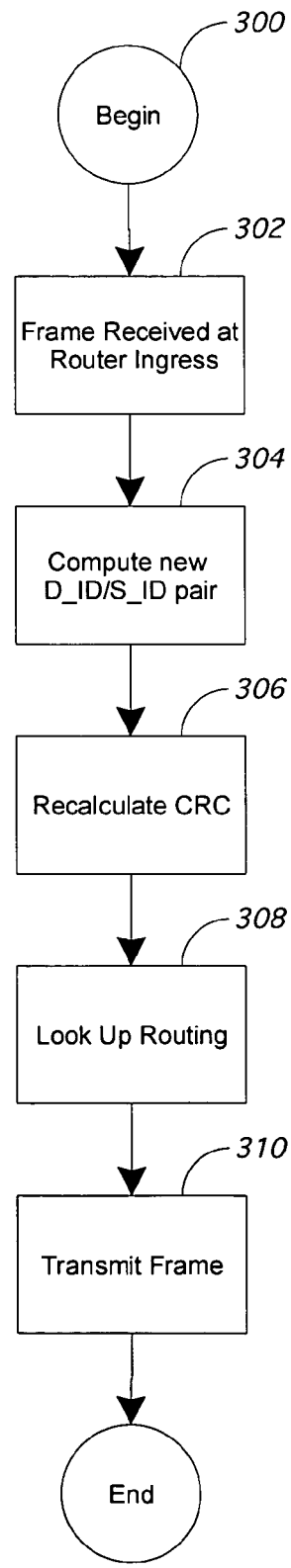
FIG. 7 is a flow chart showing a method of inter-fabric routing.

The method used to allow communications between two different SANs directly attached to a router 100 is shown in the flow chart 300 of FIG. 7. The process starts at step 302, when a frame 10 is received at a ingress port to the router 100. The router 100 then accesses translation table 110 at step 304 to compute a new D_ID/S_ID pair based upon the ingress port and the original D_ID/S_ID pair in the frame 10. At step 306, the router 100 computes a new CRC value 18 for the frame 10, since the change in destination ID 60 and source ID 70 would otherwise cause a CRC error. At step 308, the router 100 accesses a routing database to determine the appropriate transmission port, from which the translated frame is then transmitted at step 310.

Creating Proxy Devices

Figure 4:
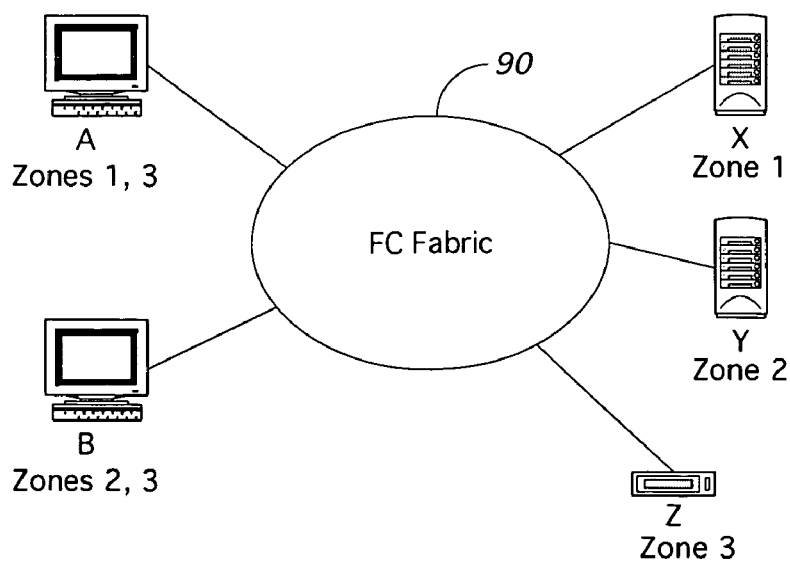
FIG. 4 is a block diagram showing zoning in a Fibre Channel fabric.

In the preferred embodiment, an administrator assists in the creation of the proxy devices. The administrator starts by creating a proxy zone. To do this, the administrator selects a zone name and prepends the string "PZONE_" to the name. The administrator will then add zone members to the newly created proxy zone name using zone member identifier type 01h (N_Port_Name). After the Proxy Zone(s) have been created, the administrator the performs the appropriate steps to get the Proxy Zone Name(s) into the active Zone Set for the fabrics 200, 220, 240. The zoning created contains both local and proxy devices, but is otherwise similar to the zoning shown in FIG. 4. Proxy zones must be created in this manner in order for remote device communication to occur over the router 100. In FIG. 5, a proxy zone in SAN A 200 would contain server 202 and proxy tape device 223. SAN B 220 would contain a proxy zone having tape device 222 and proxy server devices 203 and 243 as members. In SAN C 240, a proxy zone would be created containing server 242 and proxy tape device 224.

After the zone set containing the proxy zone name(s) has been activated, the router 100 assigns a Fibre Channel address 80 for each proxy device. In the preferred embodiment, this address identifier has i) a domain ID 82 equal to the local domain ID 82 of the router 100; ii) an area ID 84 equal to the port number of the local ingress port (i.e., EP-1, EP-2, or EP-4 in FIG. 5); and iii) a proxy device number starting at zero and incrementing by one. The router 100 then updates the local mapping table and populates the name server in the fabrics 200, 220, 240 with an entry for each proxy device. Finally, the router 100 sends an RSCN to the appropriate (registered) ports to announce the new proxy device(s). If the router 100 is operating in remote mode, as described below, the router 100 will also send a specialized SW_ILS message (an ERMT) to a peer router.

Remote Inter-Fabric Routing

Proxy Ports

Figure 8:
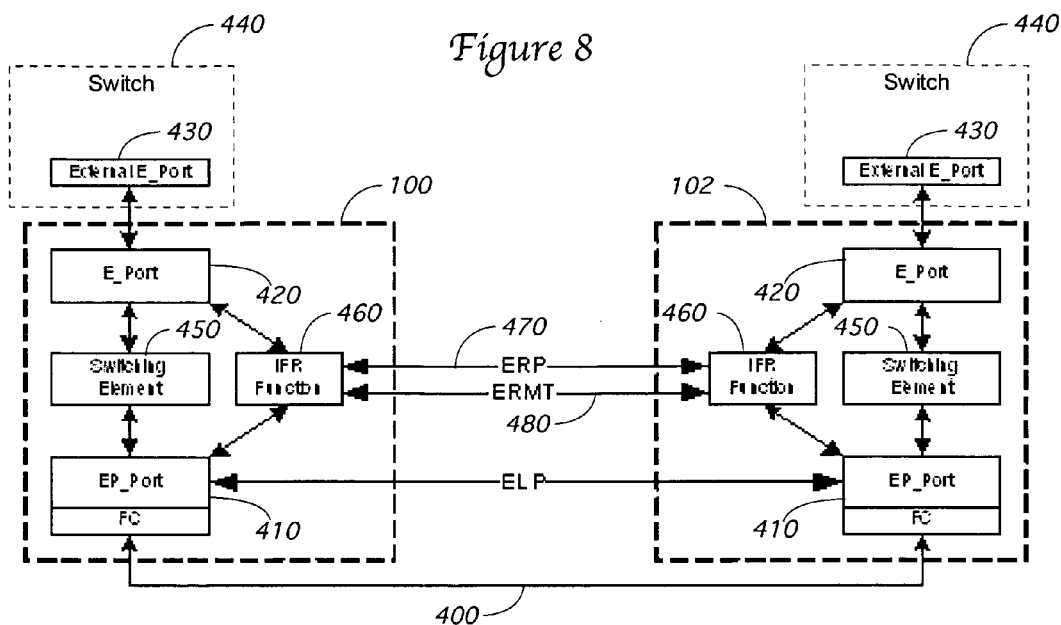
FIG. 8 is a block diagram showing an EP_port of the present invention.
Figure 9:
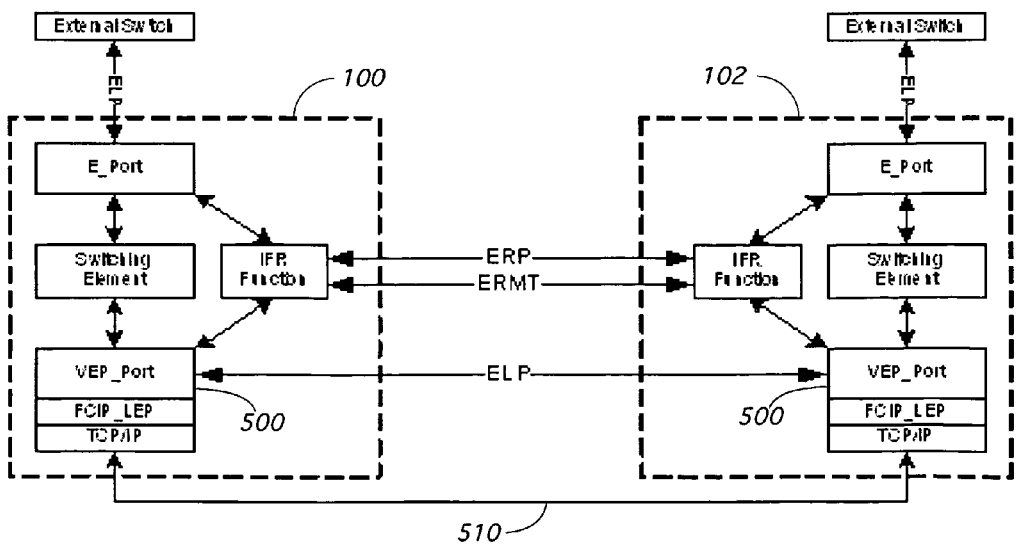
FIG. 9 is a block diagram showing a VEP_port of the present invention.

FIG. 8 shows two routers 100, 102 of the present invention that are able communicate Fibre Channel frames to one another over a Fibre Channel link 400. To accomplish this, the router 100 connects to one or more other routers through a new FC port type called an EP_port 410, for "Expansion Proxy Port." This port is much like a prior art E_Port 412 used to create interswitch links, except that the EP_port 410 must handle inter-fabric zoning activities and the exchange of service messages between routers 100, 102. These messages allow the present invention to operate and are described in more detail below. Each of the routers 100, 102 are shown with standard E_ports 420, which allow the routers 100, 102 to connect to the E_ports 430 of standard switches 440. Each router 100, 102 also has a switching element 450 which handles the Fibre Channel switching requirements of the routers 100, 102. In addition, the routers 100, 102 contain digital logic components 460 that handle the inter-fabric routing components of the routers 100, 102. These logic components (labeled "IFR Function" in FIG. 8) contain firmware or software that is responsible for maintain translation tables 110, 112, for performing the translation of the Fibre Channel addresses 80 in frames 10 destined to proxy devices, and for handling the inter-router communications. In FIG. 9, the IFR logic components 460 communicate with each other over frames passed over the Fibre Channel link 400. These communications include ERP messages 470, and ERMT messages 480, as described below. The EP_Ports 410 are responsible to handling the communication of exchange link parameters ILS messages 490.

The FC-BB2 standard also defines a virtual expansion port known as a VE_Port, which communicates between Fibre Channel switches over an IP network. Like the EP_port, the present invention adds proxy-handling capabilities to the VE_Port, and thereby creates a virtual expansion proxy port, or VEP_port 500, as shown in FIG. 9. These ports 500 communicate over IP link 510.

Figure 10:
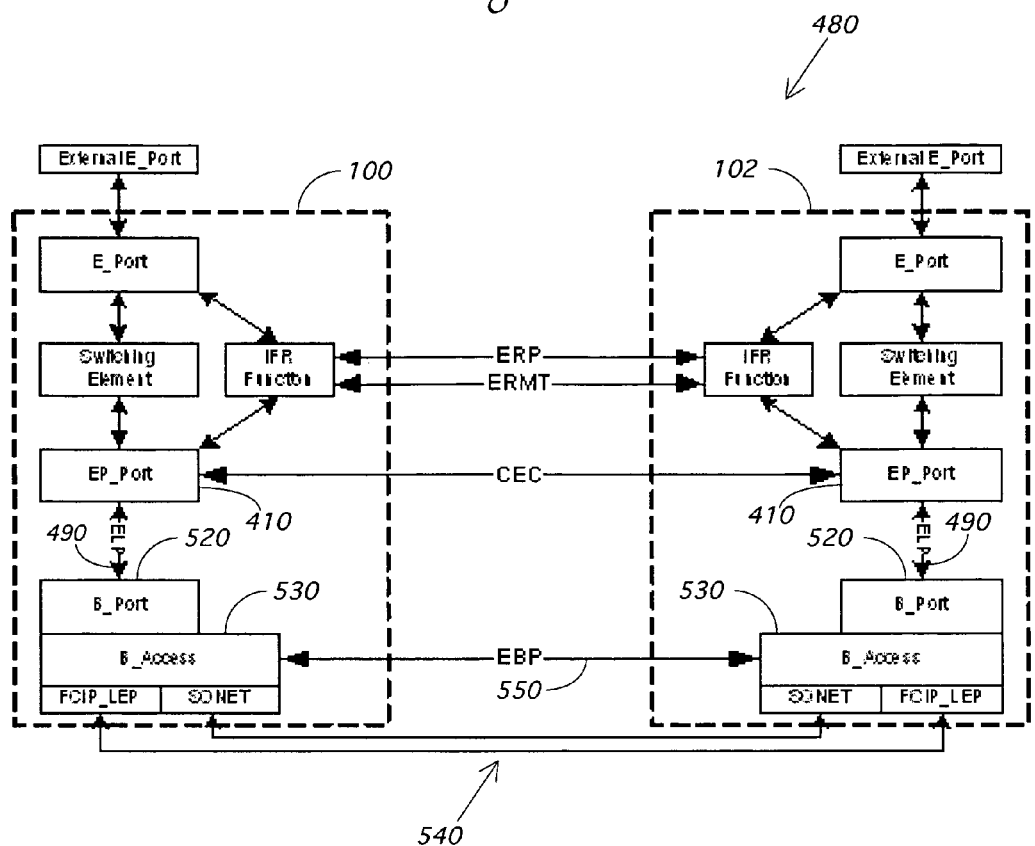
FIG. 10 is a block diagram showing an EP_port of the present invention communicating through a B_Port and B_Access.

The present invention can also utilize B_Port 520 and B_Access 530 standards as shown in FIG. 10. To function with this standard, the routers 100, 102 use EP_Ports 410 to communicate with a B_Port 520 within the router. The EP_port 410 and the B_Port 520 communicate ELP messages 490 internal to the routers 100, 102. The EP_Ports 410 communicate Check E_Port Connectivity messages (CEC), as expected by the Fibre Channel-SW-4 standard. The B_Port 520 and B_Access 530 components communicate with each other over WAN connection 540, and communicate EBP (Exchange B_Access Parameters) messages 550 as expected in the Fibre Channel-BB-2 standard.

Multiple Router Configuration

Figures 11, 12:
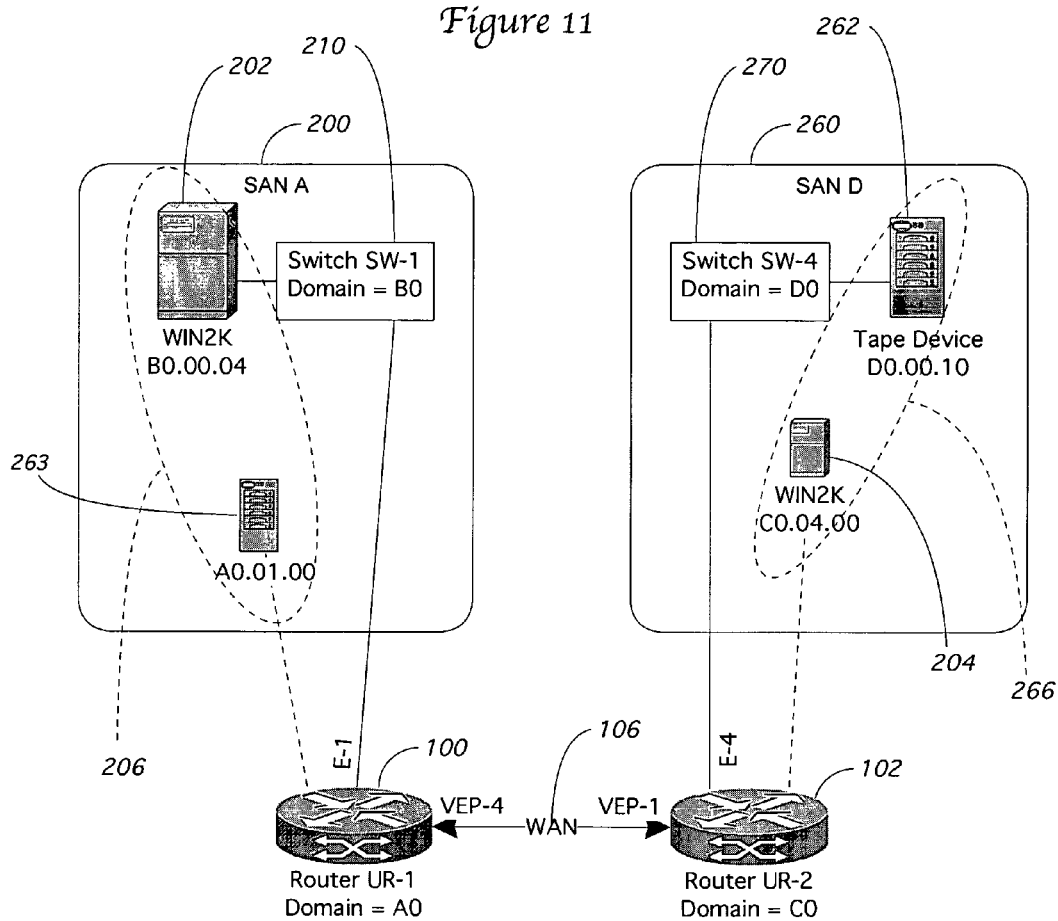
FIG. 11 is a block diagram showing a pair of routers of the present invention facilitating inter-fabric communications.
FIG. 12 is an address translation table with a routing port.

FIG. 11 shows two routers 100, 102 acting to allow communication between devices within two remotely located SANs 200, 260. This configuration differs from that in FIG. 5 in that the two SANs 200, 260 do not communicate with the same router 100. Instead, switch SW-1 210 in SAN A 100 is in communication with router UR-1 100, while switch SW-4 230 in SAN D 260 is in communication with router UR-2 102. In this configuration, traffic from SAN A 200 must pass through both routers 100, 102 before it will be received by SAN D 260. Assuming communication from SAN A 200 to SAN D 260, router UR-1 100 is considered the ingress router, and router UR-2 102 is considered the egress router.

In the preferred embodiment, the ingress router handles all address translation that is necessary for inter-fabric communication of Fibre Channel frames 10. The egress router does not perform any address translation, but instead simply routes the incoming frames to the correct Fibre Channel port. The ports used by the routers 100, 102 to connect to each other in FIG. 11 are labeled as VEP-ports 1 and 4. These ports are used for remote communication over a wide area network, such as the WAN 106 shown in FIG. 11.

The process for communicating between remote SANS 200, 260 is similar to the process described above. As before, proxy zones are created in the fabrics 200, 260. Proxy zone 206 contains the WIN2K device 202 and the proxy tape device 263 in SAN A 200, while proxy zone 266 contains the tape device 262 and the proxy WIN2K device 204 in SAN D 260. Thereafter, a proxy device entry 263 for Tape device 262 is created in the name servers of SAN A 200 and a proxy device entry 204 for the server 202 is created in SAN D 260.

At this point, the WIN2K server 202 sees the Tape device 262 as just another local device and may send FC frames to the Tape device 262 using the destination address identifier A0 01 00 of the proxy device 263. Router 100 serves as the ingress router, and therefore behaves like the router in FIG. 5. In other words, the router 100 receives the ingress frame and looks up the D_ID/S_ID pair in its translation table 112, as shown in FIG. 12. The ingress D_ID/S_ID pair A0 01 00/B0

00 04 from port E-1 is translated by UR-1 router 100 to D0 00 10/C0 04 00. UR-1 router 100 then transmits the frame with the translated D_ID/S_ID pair to UR-2 router 102 by sending the frame out port VEP-4. UR-2 router 102 then receives the translated frame over its VEP-1 port. Since both the destination ID 60 and the source ID 70 have been translated for SAN D 260, there is no need for the egress router 102 to translate any addresses. Instead, the frame is simply routed out of port EP-4 to switch 270. When the tape device 262 responds to the received FC frames, it will use the destination address identifier C0 04 00 corresponding to the proxy device 204, since this was the address in the source ID field 70 of the received frame. This transmitted frame is sent to router UR-2 102, where it is received on port EP-4. Turning to the translation table 112, this router 102 will now function as the ingress router, and will translate the D_ID/S_ID pair as indicated in table 112. The return frame is sent by UR-2 router 102 on its VEP-1 port and is received by router UR-1 100 on port VEP-4. Router UR-1 1000 then routes the frame without further translation to switch SW-1 210 in SAN A 200 via port E-1.

The WAN link 106 may be of a variety of topologies. In the preferred embodiment, the topology of WAN link 106 can be selected from SONET (FC-BB-2_SONET, FC-BB-3_SONET, and FC-BB-3_GFPT), Gigabit Ethernet (FC-BB-2_IP, FC-BB-3_IP), or FC (using the EP_Port of the present invention).

Specialized Headers

In order to allow the remote communication shown in FIG. 11 between routers 100, 102, it is necessary to communicate data frames between the routers. To accomplish this, the present invention can use two specialized headers, the routing header 600 and the encapsulation header 640.

Inter-Fabric Routing (IFR) Header

The routing header 600 is not a requirement for the present invention, particularly when a single router 100 directly connects to all fabrics that are to be linked (as in FIG. 5). In this case, the frames 10 are received from a source fabric, the destination and source address 60, 70 are translated, and the modified frame is placed onto the destination fabric by the same router 100. In more complicated routing scenarios, such as that shown in FIG. 11, the use of routing header 600 becomes desirable but not always mandatory. The communication between UR-1 router 100 and UR-2 router 102 may be a direct, point-to-point link over a wide area network. The router header 600 is useful in this environment since the routing header 600 provides a method to detect stale frames, prioritize frames, and detect routing loops. However, no intermediate routing is required. In a third scenario, the present invention sends proxy communications over multiple hops of inter-fabric routers 100. In this case, the data frames may pass through intermediate fabrics that do not contain the destination device. In this case, the translated destination address 60 created by the ingress router would not be applicable or recognizable to the intermediate frame. In this case, the routing header 600 is mandatory, since the routing header 600 contains the destination fabric identifiers 604 and the source fabric identifier 614, as explained below.

The format of the IFR_Header 600 is shown in FIG. 13. The header includes the following fields: R_CTL 602 (Routing Control), DF_ID 604 (Destination Fabric Identifier), Ver 606 (Version), Pri 608 (Priority), ETV 610 (Expiration Time Valid), HCV 612 (Hop Count Valid), SF_ID 614 (Source Fabric Identifier), Exp_Time 616 (Expiration Time), and Hop_Cnt 618 (Hop Count). The Routing Control (R_CTL) value 602 is set to 51h by the ingress inter-fabric router. The Destination Fabric Identifier (DF_ID) field 604 is set by the ingress inter-fabric router to the identifier of the destination fabric for which the enclosed frame is intended. This field can be used by devices that exist on intermediate fabrics between the ingress and egress routers to route the frame to the egress router. The Version (Ver) field 606 specifies the version of the IFR_Header 600. For the format specified in table 5 the Version field shall be set to 00b. The Priority (Pri) field 608 specifies the Quality of Service (QoS) value for the frame (see 802.1D-1998). The Expiration Time Valid (ETV) bit 610 shall be set to one if the Exp_Time field is valid. The Expiration Time Valid bit shall be set to zero if the Exp_Time field is not valid. The Hop Count Valid (HCV) bit 612 shall be set to one if the Hop_Cnt field 618 is valid. The Hop Count Valid bit 612 shall be set to zero if the Hop_Cnt field 618 is not valid. The Source Fabric Identifier (SF_ID) field 614 is set by ingress inter-fabric router to the identifier of the fabric that originated the enclosed frame.

The Expiration Time (Exp_Time) field 616 is set to the time at which inter-fabric routing devices 100, 102 receiving the IFR_Header 600 shall discard the received frame. The use of the Exp_Time value as an expiration timer requires that all inter-fabric routers that process the IFR_Header 600 have the same time value +/−1 count. The ingress inter-fabric router shall not set the Exp_Time field to a value that is greater than the resource allocation timeout value (R_A_TOV) used by the ingress inter-fabric router and the Exp_Time value shall not be set more than 126*0.25 (i.e., 31.5 seconds) greater than the EXP_TIMESTAMP field value of the ingress inter-fabric router.

In the preferred embodiment, each inter-fabric router 100, 102 maintains a local clock that is synchronized to all other inter-fabric router clocks to an initial accuracy of +/−0.250 seconds and a running accuracy of +/−20 PPM. The Exp_Time value shall be compared to the equivalent of bits 37 to 30 in the Network Time Protocol 64-bit timestamp field 520 (see RFC 2030), as shown in FIG. 14. This range of bits of the local dock is called the Expiration Timestamp (EXP_TIMESTAMP) value (see FIG. 14). The EXP_TIMESTAMP value has a resolution of 0.25 seconds. An inter-fabric router shall discard a received frame if the result of (EXP_TIMESTAMP−Exp_Time) is between 2 and 127 using modulo 256 arithmetic.

Alternatively, each inter-fabric router 100, 102 could use the Simple Network Time Protocol (see RFC 2030) to maintain a local clock that is synchronized and formatted for checking the Exp_Time value. The initial accuracy shall be +/−0.250 seconds and the running accuracy shall be +/−20 PPM. The Exp_Time value shall be compared to bits 37 to 30 in the Network Time Protocol (NTP) 64-bit timestamp field 540 (FIG. 14). This range of bits in the NTP timestamp field is called the Expiration Timestamp (EXP_TIMESTAMP) field. The EXP_TIMESTAMP field has a resolution of 0.25 seconds. An inter-fabric router shall discard a received frame if the result of (EXP_TIMESTAMP−Exp_Time) is between 2 and 127 using modulo 256 arithmetic.

The Hop Count (Hop_Cnt) field 618 specifies the number of hops remaining before the frame is discarded. The ingress inter-fabric router 100, 102 shall set the initial Hop_Cnt value. If an inter-fabric router 100 receives a frame with a Hop_Cnt field value of 01h, the frame shall be discarded. If an inter-fabric router 100, 102 receives a frame with a Hop_Cnt field value of 00h, the frame shall not be discarded. Otherwise, each inter-fabric router 100, 102 that receives and forwards the frame shall decrement the Hop_Cnt field value by one if the Hop Count Valid (HCV) bit is set to one.

Encapsulation Header

The encapsulation header is used to tunnel frames containing the routing or IFR header 600 through legacy fabrics. Note that the legacy fabric is expected to process frames containing an R_CTL value of 52h.

Figure 1:
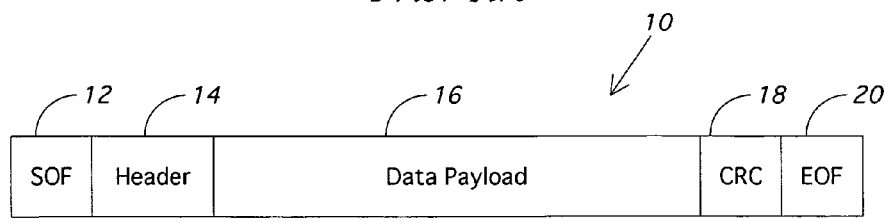
FIG. 1 is a block diagram showing a variable-length Fibre Channel frame.
Figure 2:
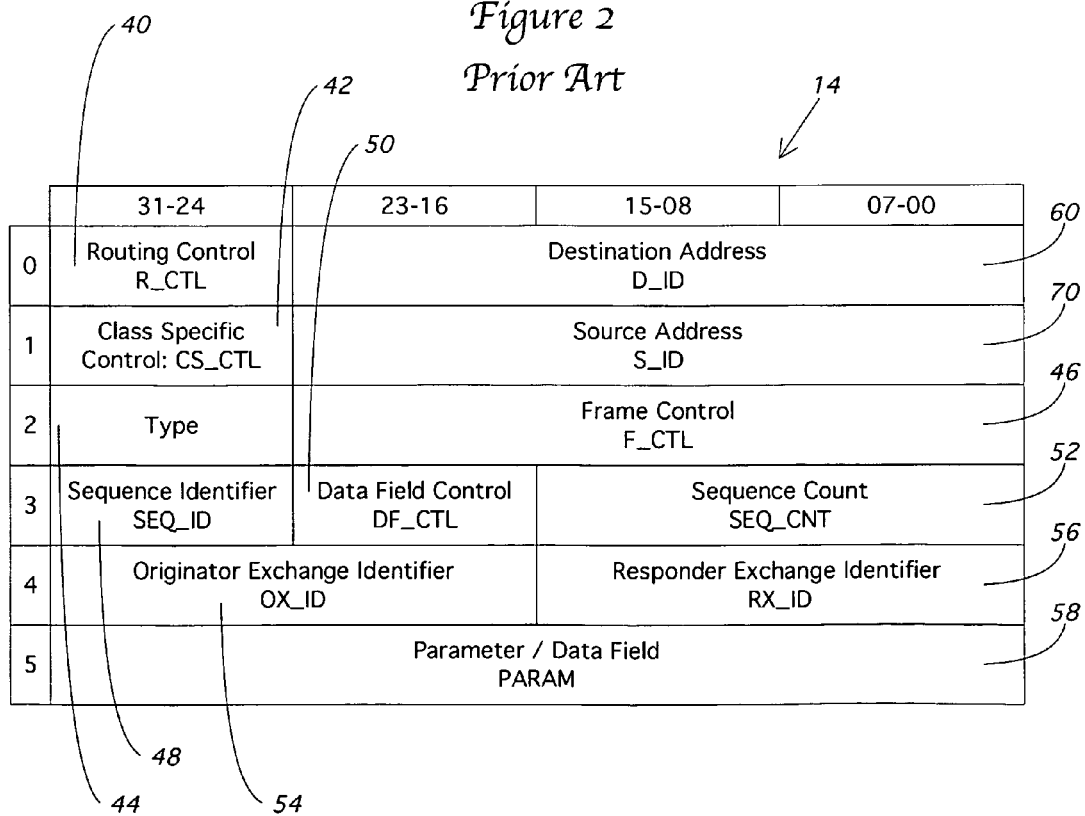
FIG. 2 is a block diagram showing the components of the header of the Fibre Channel frame shown in FIG. 1.
Figure 3:
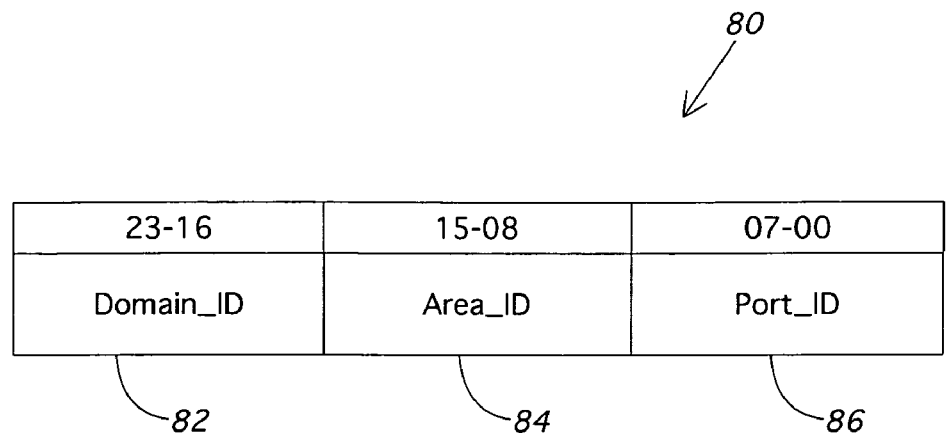
FIG. 3 is a block diagram showing the components of a Fibre Channel port identifier.

The encapsulation header 640 is used when the neighboring routers do not support the IFR headers 600 directly. The format of the encapsulation header (Enc_Header) 640 is shown in FIG. 15. The Enc_Header fields 600 are generally identical in definition to the fields defined for the Fibre Channel frame header 14 shown in FIG. 2. Because of the common definitions between the fields of the encapsulation header 640 and the frame header 14, the encapsulation header 640 may be used to route frames from N_Port to N_Port within an FC-SW-3 compliant fabric. The N_Port may be a proxy or translation gateway 100, 102 capable of directing the encapsulated frame to another fabric. FC-SW-4 provides standard architectural models for the use of encapsulation header 640. The only distinction being that the routing control (R_CTL) value is set by the source of the encapsulation header 640 to the value 52h.

Sharing of Routing Information

In order for two routers 100, 102 of the present invention to function properly, they must communicate with each other about the proxy devices that are being established. This communication requires two new Internal Link Service (ILS) message structures: and Exchange Router Parameters (ERP) ILD, and an Exchange Router Mapping Table (ERMT) ILS.

EPR SW_ILS: Exchange Router Parameters

Before using an inter-fabric routing header 600, it is necessary for a router 100 to determine whether neighboring routers 102 support IFR headers 600. This is generally accomplished using the Exchange Router Parameters (ERP) SW_ILS.

It would also be possible to determine support using Exchange Switch Support (ESS) SW_ILS messages, by specifying an IFR capability object. However, ESS messages are sent to a Domain Controller and therefore require a Domain ID 82 before they can be sent. In contrast, an ERP is sent to the fabric controller.

A fabric controller indicates support for IFR headers by sending an ILS containing an ERP request payload 650 to the destination fabric controller, as shown in FIG. 16. The exchange of Router Parameters establishes the operating environment between the two Interconnect_Ports. For use in switch port initialization, the S_ID field in the EPR ILS shall be set to FFFFFDh, indicating the Fabric Controller of the originating Switch; the D_ID field shall be set to FFFFFDh, indicating the Fabric Controller of the destination Switch. The Fabric Controller responding to the ERP request indicates support for IFR headers by sending an ERP SW_ACC payload 660, as shown in FIG. 17. If an EP_Port 410 receives an SW_RJT (reject) in response to an ERP request 650, the EP_Port 410 shall prepend an Enc_Header 640 to all received frames containing an FR_Header 600 that are transmitted by that port 410.

ERMT SW_ILS: Exchange Router Mapping Table

The Exchange Router Mapping Table ILS uses the request payload 670 shown in FIG. 18. This ILS is used to distribute mapping table information between inter-fabric routing capable switches 100. As part of this process, the ERMT is used to register a new proxy device with other routers of the present invention. The S_ID shall be set to FFFCxxh designating the Domain Controller ID of the Switch that generates the ERMT. The D_ID shall be set to FFFCyyh to designate the Domain Controller ID of the recipient Switch. The Number of Mapping_Table_List records field specifies the number of Mapping_Table_List records 680 contained in the payload. The format for the Mapping_Table_List records 680 is specified in FIG. 19.

The receiving router may accept or reject the ERMT SW_ILS 670. A Service Reject (SW_RJT) signifies the rejection of the ERMT request 670. An accept (SW_ACC) 690 signifies acceptance of the ERMT request 670. The format of the ERMT Accept payload 690 is shown in FIG. 20.

Handling of Selected Link Services

Certain ELS's and FC-4 Link Services (e.g., PLOGI and ELS's that contain an N_Port address identifier in the payload) must be processed by software in routers 100, 102. The reason for this the that the payloads of these frames may contain instances of the source destination address 60 or the source address 70 that is also found in the Fibre Channel frame header 14. While the above description of address translation functions appropriately to change the destination address 60 and source address fields 70, embedded addresses are not automatically translated. Thus, the messages must be specially handled to ensure that the data payload is altered, if necessary, to correspond to the appropriate proxy port addresses 80.

Each Link Service request contains a unique command code in bits 31:24 of the first word in the payload. The command code shall be read to determine if special handling is required. Thus, in order to determine whether a particular frame requires special handling, both the R_CTL value and the command code must be examined. The R_CTL values for the ELS communications that need to be specially handled are specified in table 700 shown in FIG. 21. Table 710 in FIG. 22 lists the command codes and associated ELS commands that require special handling. In other words, an ELS request is identified by an R_CTL value of 22h. Once identified, the command code is examined in table 710 to determine if this particular ELS requires special handling. Table 720 in FIG. 23 specifies command codes and associated FC-4 Link Services commands that require special handling.

While examining the command code is adequate to determine which ELS or Fibre Channel-4 Link needs special handling simply by comparing the code to tables 710 and 720, the examining of command codes does not work when examining the replies to these service requests. This is because each Link Service Accept reply (LS_ACC) contains the same command code (i.e., 0×20) in bits 31:24 of the first word in the payload. Thus it is not possible to determine if the Link Service Accept reply needs special handling using just the command code.

To solve this problem, the present invention recognizes replies that require special handling by examining the source ID 70 and the originator exchange identifier 54 for each reply and compares this information to earlier stored information. This can be seen in the frame progression chart 750 in FIG. 24. At step 770, an ELS service request 760 is sent from the host to a remote device in another fabric. The ELS 760 has a command code of 52h, and therefore is a Discover Address or ADSIC ELS (as seen in Table 710 of FIG. 22). This link service request 760 is being sent to proxy device address A0 01 00 from a host at physical address B0 00 04. In the body of the request 760 is the command code 0×52 and a port address 80 indicating the N_Port of the originator. The host sets this to its physical Fibre Channel address B0 00 04. The host then submits the request to router UR-1.

When the request 760 is received at ingress router UR-1 at step 772, the destination address 60 is translated to the physical address of the destination device, and the source address 70 is translated to the proxy address of the host in the fabric of the destination device. This is accomplished using the process described above. The request 760 is also identified as an ELS having a command code of 52h, and therefore requires special handling. The special handling is accomplished at step 772 by translating the originator address in the body of ELS 760. The ELS 760 is then transmitted to Router UR-2 at step 774. At this point, Router UR-2 is the egress router, and it is charged to recognize all frames requiring special handling that it will put out into its local fabric. In this step, as in step 772, the router will identify this ELS by the R_CTL value and the Command code. Although no more special handling is required at this egress router, the egress router saves the source address 70 and the OX_ID 54 for the Exchange in local memory. This is done for each Link Service request that requires special handling. The ELS 760 is then submitted to the device at step 776.

The device response to this ELS by generating a reply 762. This reply also contains the N_Port address 80 of the originator, which the device will set to its physical address D00100. The reply 762 is then submitted to router UR-2 782, which can identify this as an ELS reply by the R_CTL value. As the ingress router, router UR-2 will try to determine if the ELS requires special handling. The command value of 0x20, however, does not allow the ingress router UR-2 to determine if the reply requires special handling directly. Instead, at step 782 router UR-2 compares the destination address 60 and the OX_ID 52 of the reply 762 with the saved S_ID/OX_ID pair saved in step 774. If there is a match, the router UR-2 knows that the reply 762 requires special handling. In this case, the router UR-2 does perform special handling, and the value in the ELS for the N_Port of the originator is modified to reflect the proxy address of the device. Once this is completed, router UR-2 will translate the destination address 60 and the source address 70 of reply 762 as explained above. At this point, step 782 is completed, and the reply is forwarded to router UR-1 at step 784. In this case, router UR-1 does not expect a reply directly to this reply 762, and therefore does not need to save the S_ID/OX_ID pair. The reply is now forwarded to the host at step 786.

The actual type of special handling that is done on these service request frames varies depending upon the command involved. Processing details for each required Link Service is specified in table 790 of FIG. 25.

Figure 26:
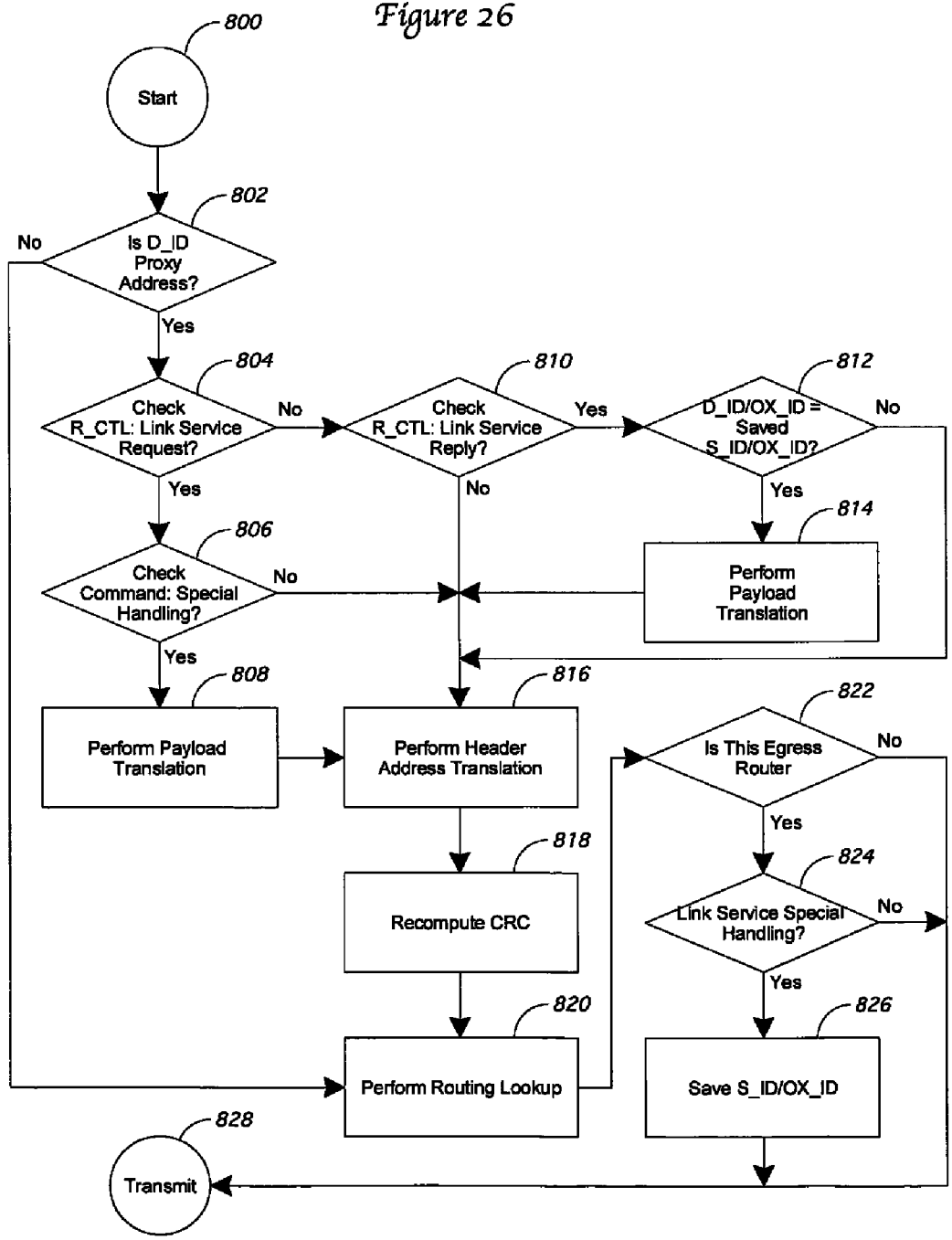
FIG. 26 is a flow chart showing the process of analyzing frames at a router of the present invention.

FIG. 26 shows a flow chart 800 that contains the overall process used for routing and address translation in the present invention. The first step 802 is to determine whether or not the destination ID 60 in the frame is a proxy address or a physical address. If it is a physical address, no address translation is required in the header or the payload. Note that only an ingress router will encounter a destination ID 60 with a proxy address. If it destination ID 60 is a proxy address, step 804 checks the R_CTL value to determine if this frame is a link service request. If so, step 806 determines whether this link service request requires special handling. If so, step 808 performs any necessary payload address translations.

If the R_CTL value did not indicate that this was a link service request, step 810 determines if the R_CTL value indicates that the frame is a link service reply. If so, step 812 checks whether a stored S_ID/OX_ID value matches the D_ID/OX_ID of the link service reply. If so, step 814 performs the payload translation as described above.

All frames with a proxy address in the destination identifier 60 will enter step 816, where the destination identifier 60 and the source identifier 70 are translated as described above. The CRC value for the frame is recalculated in step 818 and inserted into the frame.

At step 820, the routing for the frame is accomplished. Note that this is done on the translated destination identifier if the translation were accomplished at step 816. If the destination ID 60 were not found to be a proxy address at step 802, then this routing lookup would be performed on the original physical address.

Once the routing has been performed, step 822 determines if this is the egress router. If so, step 824 determines whether this is a link service request that required special handling. This determination is similar to the determination made at steps 804 and 806. If step 824 does determine that this frame required special handling, then step 826 saves the source identifier 70 and to originator exchange identifier 54 locally for later comparison with a reply frame at step 812. Whether or not step 826 saves the S_ID/OX_ID value pair, the last step in process 800 is to transmit the frame at step 828.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A routing device, comprising:
   a switch configured to direct a frame from a first fabric to a second fabric, the frame comprising a source ID corresponding to a first physical port address of a first physical device and a destination ID corresponding to a first proxy address of a first proxy device, the first physical port address and the first proxy address being first fabric addresses; and
   routing logic configured to translate the destination ID to a second physical port address of a second physical device and the source ID to a second proxy address of a second proxy device, the second physical port address and the second proxy address being second fabric addresses;
   wherein the frame is a link service frame comprising a port address in a payload and said routing logic further identifies the frame as needing software processing by examining a header and a command code in the frame, the software processing comprising translating the port address in the payload;
   wherein the routing logic further identifies a second frame received by the routing device as a link services request, a source ID of the second frame matching the first proxy address and the routing logic further stores within a memory the source ID and the originator exchange ID of the second frame and directs the second frame to the first fabric; and
   wherein the routing logic further identifies a third frame received by the routing device as a link services reply and the routing logic further translates a port address within a data payload of the third frame if the destination ID and the originator exchange ID within the third frame respectively match the stored source ID and stored originator exchange ID.

2. The routing device of claim 1, wherein examining the header comprises examining an R_CTL value.

3. The routing device of claim 1, wherein the frame comprises translated source and destination IDs and is directed to a wide area network (WAN) identified as a path to the second fabric.

4. The routing device of claim 3, wherein the frame is prepared for transmission over the WAN as one or more SONET frames or as one or more Gigabit Ethernet frames.

5. The routing device of claim 1, wherein the frame comprises translated source and destination IDs and is directed to a third fabric identified as a path to the second fabric.

6. The routing device of claim 5, wherein the frame is prepared for transmission over the third fabric by adding an inter-fabric routing header.

7. The routing device of claim 6, wherein the inter-fabric routing header comprises a hop count field and an expiration timer.

8. The routing device of claim 6, wherein the inter-fabric routing header comprises a source fabric identifier that identifies the first fabric and a destination fabric identifier that identifies the second fabric.

9. The routing device of claim 6, wherein the frame is further prepared for transmission by adding an encapsulation header after adding the inter-fabric routing header.

10. A method, comprising:
translating, by a routing device, a destination ID within a received frame from that of a first proxy address of a first proxy device to that of a second physical port address of a second physical device and a source ID from that of a first physical port address of a first physical device to that of a second proxy address of a second proxy device, the first physical port address and the first proxy address being first fabric addresses and the second physical port address and the second proxy address being second fabric addresses;
identifying, by the routing device, the frame as needing software processing by examining a header and a command code in the frame, the frame further comprising a port address in a payload, wherein the software processing comprises translating the port address in the payload;
identifying, by the routing device, a second frame as a link services request;
identifying, by the routing device, a source ID of the second frame as matching the first proxy address;
storing, by the routing device, the source ID and an originator exchange ID of the second frame;
identifying, by the routing device, a third frame as a link services reply; and
translating, by the routing device, a port address within a data payload of the third frame if a destination ID and an originator exchange ID within the third frame respectively match the stored source ID and stored originator exchange ID.

11. The method of claim 10, wherein examining the header comprises examining an R_CTL value.

12. The method of claim 10, wherein the frame comprises translated source and destination IDs and the method further comprises directing the frame to a wide area network (WAN) identified as a path to the second fabric.

13. The method of claim 12, further comprising preparing, by the routing device, the frame for transmission over the WAN as one or more SONET frames or as one or more Gigabit Ethernet frames.

14. The method of claim 10, wherein the frame comprises translated source and destination IDs and the method further comprises directing the frame to a third fabric identified as a path to the second fabric.

15. The method of claim 14, further comprising preparing, by the routing device, the frame for transmission over the third fabric by adding an inter-fabric routing header.

16. The method of claim 15, wherein the inter-fabric routing header comprises a hop count field and an expiration timer.

17. The method of claim 15, wherein the inter-fabric routing header comprises a source fabric identifier that identifies the first fabric and a destination fabric identifier that identifies the second fabric.

18. The method of claim 15, further comprising preparing, by the routing device, the frame for transmission by adding an encapsulation header after adding the inter-fabric routing header.

* * * * *